United States Patent
Aihara et al.

(10) Patent No.: US 8,326,762 B2
(45) Date of Patent: Dec. 4, 2012

(54) CONTROL METHOD FOR A COMMUNICATION RELAY SYSTEM

(75) Inventors: Toru Aihara, Yokohama (JP); Noboru Kamijoh, Fujisawa (JP); Kazumasa Ochiai, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 1503 days.

(21) Appl. No.: 11/350,564

(22) Filed: Feb. 9, 2006

(65) Prior Publication Data

US 2006/0179000 A1  Aug. 10, 2006

(30) Foreign Application Priority Data

Feb. 10, 2005 (JP) .................... 2005-34701

(51) Int. Cl.
*G06F 21/00* (2006.01)
(52) U.S. Cl. ................ 705/52; 705/50; 705/77
(58) Field of Classification Search .............. 705/52, 705/50, 77; 709/223
See application file for complete search history.

(56) References Cited

U.S. PATENT DOCUMENTS

| | | | | |
|---|---|---|---|---|
| 7,190,790 B1 * | 3/2007 | Hill et al. | ......................... | 380/44 |
| 7,194,528 B1 * | 3/2007 | Davidow | ....................... | 709/223 |
| 2002/0004788 A1 * | 1/2002 | Gros et al. | ....................... | 705/80 |
| 2003/0159139 A1 * | 8/2003 | Candelore et al. | .............. | 725/25 |
| 2004/0261101 A1 * | 12/2004 | Iwamura | ......................... | 725/32 |
| 2005/0220026 A1 * | 10/2005 | Dziong et al. | ................ | 370/237 |

FOREIGN PATENT DOCUMENTS

| | | |
|---|---|---|
| CN | 139591 | 2/2003 |
| JP | 2002-344511 | 11/2002 |
| JP | 2004-048435 | 2/2004 |
| JP | 2004-112683 | 4/2004 |
| JP | 2004-312088 | 11/2004 |

OTHER PUBLICATIONS

"Summary of Power Line Communications (Japanese Document)" (High Speed Power Line Communication Promoters' Alliances of Japan) URL: http://www.plc-jorg/en/about_plc_system.htm.

* cited by examiner

*Primary Examiner* — Chrystina Zelaskiewicz
(74) *Attorney, Agent, or Firm* — Shimokaji & Assoc., PC

(57) ABSTRACT

In a case where a secondary use of a communication line which is provided as a communication service is permitted, an appropriate communication charge to be charged to each user is computed in order to promote the use of the communication line. There is provided a communication relay system providing communication service which connects a communication device to an existing communication network. The communication relay system includes a communication relaying unit which connects a primary communication device connected to a predetermined primary communication line to the communication network to relay communication between the primary communication device used by a subscriber and the communication network; an account database which records a communication charge for communication performed by the primary communication device with the communication relay system through the primary communication line; and an accounting unit which reduces the amount of the communication charge recorded in the account database, if another subscriber connects a secondary communication device to the primary communication device and the communication relaying unit connects the secondary communication device to the communication network through the primary communication line.

1 Claim, 9 Drawing Sheets

(a)

(b)

CONTROL METHOD FOR A COMMUNICATION RELAY SYSTEM

FIELD OF THE INVENTION

The present invention relates to a communication relay system, control method, program, and information processing system. In particular, the present invention relates to a communication relay system, control method, program, and information processing system providing communication services that connects communication devices to a communication network.

BACKGROUND OF THE INVENTION

FTTH (Fiber To The Home), which is the installation of fiber optic cables in homes and companies to enable high-speed communication, has emerged in recent years. The communication costs of FTTH are fairly lower than other communication means that enable continuous connections and its transmission speed is remarkably fast. However, the installation of FTTH involves the installation of new communication lines, which hinders the widespread use of FTTH. For example, installing FTTH in an apartment requires the use of common spaces in the apartment. Accordingly, even if only one of the households in an apartment wants to install FTTH, the installation requires the approval of the board of co-op or the like that manages the apartment. Furthermore, installing FTTH in some high-rise apartments can be technically difficult.

On the other hand, with the recent improvements in semiconductor technology and development of new algorithms, faster Power Line Communication (PLC) that uses frequencies in the range between 20 to 30 MHz is nearing commercial use as described in "High-Speed Power Line Communication System Overview" (High-Speed Power Line Communication Alliance of Japan, Dec. 16, 2004). PLC can use existing power lines without modifications and therefore does not require installation of new communication lines. FTTH can be installed considerably readily compared with FTTH or even cable television or ADSL (Asymmetric Digital Subscriber Line), and is expected to be widely used in general households.

DISCLOSURE OF THE INVENTION

Power line communication is a media-sharing technology in which a power line is shared among a number of neighboring houses supplied with electric power from a transformer installed on a utility pole to perform communication. It is impossible to use the power line to perform communication from these houses to a network external to them. Therefore, it is difficult to provide communication services connecting to a network such as the Internet through power line communication alone. On the other hand, if one house connects to the Internet through FTTH and that house connects with other houses through power line communication, each of those other houses may be able to connect to the Internet.

However, because the single FTTH communication line is shared among the multiple houses, the bandwidth available to the subscriber to the FTTH becomes narrower than that would be if the subscriber exclusively used the FTTH. Therefore, it is unlikely that subscribers to FTTH would willingly make their communication lines available to other houses. Furthermore, providers that provide communication services such as Internet communication services should be able to collect appropriate fees from all the users who share an FTTH communication line.

Therefore, an object of the present invention is to provide a communication relay system, control method, program, and information processing system capable of solving the problem. The objects can be achieved by a combination of features set forth in the independent claims. The dependent claims define further advantageous specific embodiments.

SUMMARY OF THE INVENTION

To achieve the object, according to a first aspect of the present invention, there is provided a communication relay system, a control method for controlling the communication relay system, a program which causes an information processing apparatus to function as the communication relay system, and an information processing system including the communication rely system and communication devices, wherein the communication relay system provides a communication service that connects a communication device to an existing communication network, including: a communication relaying unit which connects a primary communication device connected to a predetermined primary communication line to the communication network to relay communication between the primary communication device used by a subscriber and the communication network; a charge recording unit which records a communication charge for communication performed by the primary communication device with the communication relay system through the primary communication line; and an accounting unit which reduces the amount of communication charge recorded in the charge recording unit, if another subscriber connects to a secondary communication device to the primary communication device and the communication relaying unit connects the secondary communication device to the communication network through the primary communication line.

The summary of the present invention given above does not enumerate all of the essential features of the present invention. Subcombinations of these features are included in the present invention.

ADVANTAGES OF THE INVENTION

The present invention enables calculation of an appropriate communication fee to be charged to each of the subscribers to a communication service that permits secondary use of communication lines, thereby promoting the use of the communication lines.

PREFERRED EMBODIMENT OF THE INVENTION

While the present invention will be described below with respect to an embodiment thereof, the embodiment is not intended to limit the present invention, which is defined in the claims, and not all of the combinations of features described in the embodiment are essential to the inventive solution.

Figure 1:
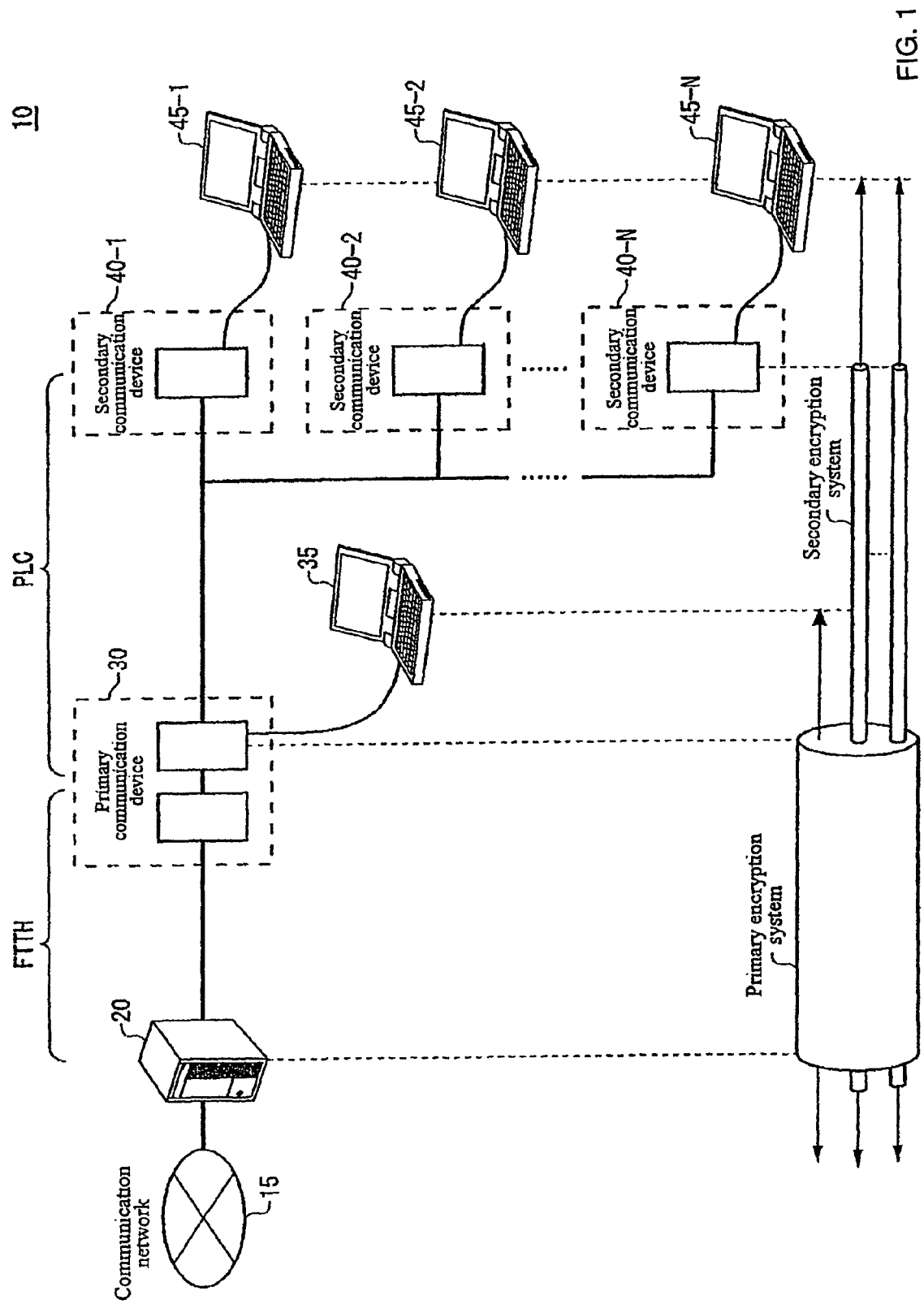
FIG. 1 shows a general configuration of an information processing apparatus 10.

FIG. 1 shows a general configuration of an information processing system 10. The information processing system 10 includes a communication network 15, a communication relay system 20, a primary communication device 30, a primary user terminal 35, secondary communication devices 40-1-40-N, and secondary user terminals 45-1-45-N. The communication network 15 is an existing communication network, for example a public network such as the Internet, or private network such as an intranet in a company. The communication relay system 20 provides communication services for connecting communication devices such as the primary communication device 30 to the communication network 15.

The primary communication device 30 is connected to the communication relay system 20 through an FTTH, which is a predetermined primary communication line, and used by a primary user that is a subscriber authorized to use the primary communication device 30. The term "subscriber authorized to use the primary communication device 30" refers to a client who is authorized to communicate with the communication relay system 20 through the primary communication line under an agreement with a telecommunication provider. The primary communication device 30 connects to the communication network 15 through encrypted communication with the communication relay system 20 according to a first encryption system agreed between the primary communication device 30 and the communication relay system 20.

More specifically, the primary communication device 30 may be a FTTH-capable communication modem or a router that relays IP (Internet Protocol) packets between FTTH and PLC, or may be a device having the functionality of both. The primary communication device 30 may be leased by the telecommunication provider to a primary user or may be purchased by a primary user. A primary user terminal 35 is used by a primary user and connects to the communication network 15 by communication with the communication relay system 20 through the primary communication device 30.

The secondary communication device 40-1 is connected to the primary communication device 30 through a PLC, which is a secondary communication line having a transmission bandwidth narrower than that of the primary communication line, and is used by a secondary user that is a subscriber authorized to use the secondary communication device 40-1. The subscriber authorized to use the secondary communication device 40-1 is a subscriber different from the primary user. In particular, the secondary user is a client authorized to use the secondary communication device 40-1 to perform communications with the communication relay system 20 through the primary communication device 30 under an agreement with the telecommunication provider. The secondary communication device 40-1 connects to the communication network 15 through the primary communication device 30 by performing encrypted communication with the communication relay system 20 according to a second encryption system agreed between the secondary communication device 40-1 and the communication relay system 20 beforehand.

More specifically, the secondary communication device 40-1 may be a router which relays communication between a PLC communication line and another communication line such as a LAN. The secondary communication device 40-1 may be lent by the telecommunication provider to the secondary user or purchased by the secondary user. The secondary user terminal 45-1 is used by the secondary user and connected to the secondary communication device 40-1. The secondary user terminal 45-1 connects to the communication network 15 through the secondary communication device 40-1 and the primary communication device 30. The secondary communication devices 40-2-40-N are practically the same as the secondary communication device 40-1 and the secondary user terminals 45-2-45-N are practically the same as the secondary user terminal 45-1, therefore description of these will be omitted, unless there are differences among them.

The communication relay system 20 according to the present embodiment computes an appropriate communication charge to be charged to each of the primary and secondary users in the information processing system 10 including the primary and secondary communication lines. The purposes of this are to enable an effective use of communication lines and to promote the use of communication services provided by the communication relay system 20.

Figure 2:
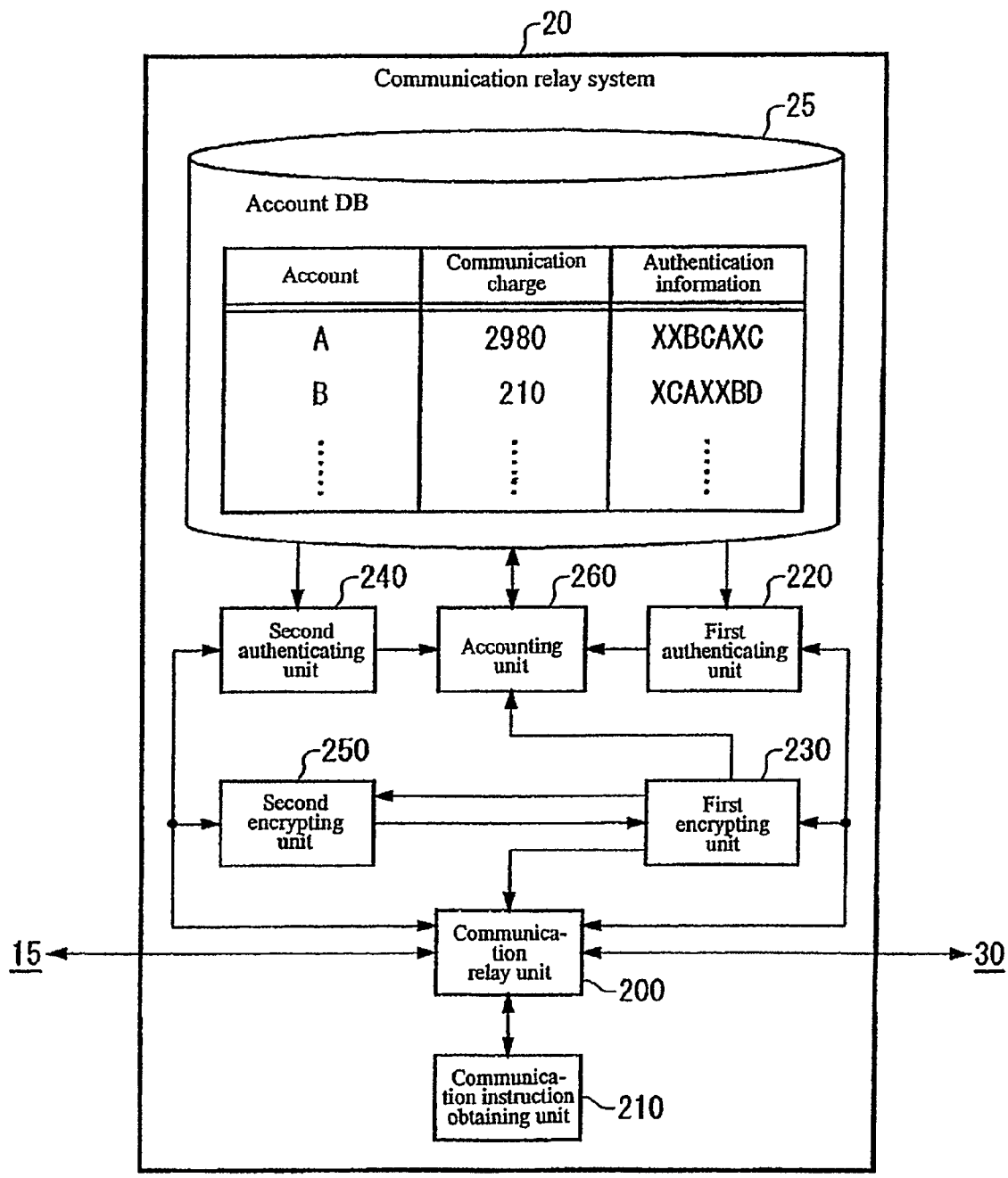
FIG. 2 shows functions of a communication relay system 20 as function blocks.

FIG. 2 shows functions of the communication relay system 20 as functional blocks. The communication relay system 20 has an account database (DB) 25, which is an example of a charge recording unit according to the present invention, a communication relaying unit 200, a communication instruction obtaining unit 210, a first authenticating unit 220, a first encryption unit 230, a second authenticating unit 240, a second encryption unit 250, and an accounting unit 260. The account DB 25 associates and records accounts for the primary and secondary users to log in the communication relay system 20 with communication charges for communication performed by communication devices of primary and secondary users to communicate with the communication relay system 20 through the primary communication line and/or the secondary communication line.

For example, the account DB 25 records an amount of charge to be charged to the primary user which is predetermined irrespective of the amount of communication performed by the primary communication device 30. In addition, the account DB 25 records the amount of charge charged to the subscriber authorized to use the secondary communication device 40-1 which increases proportionally to the amount of communication performed through the secondary communication device. Furthermore, the account DB 25 associates and records authentication information for authenticating each user with the account of the user.

The communication relaying unit 200 connects the primary communication device 30 to the communication network 15 to relay communication between the primary communication device 30 and the communication network 15 and also relays communication between the secondary communication device 40-1 and the communication network 15, if authentication of the users is successful. The communication instruction obtaining unit 210 receives from the primary communication device 30 through the communication relaying unit 200 an instruction as to whether communication by the secondary communication device 40-1 passing through the primary communication device 30 should be permitted or not. The communication relaying unit 200 relays communication between the secondary communication device 40-1 and the communication network 15 if the communication instruction obtaining unit 210 receives an instruction to permit communication performed by the secondary communication device 40-1.

The following is a detailed description of the function of authenticating primary and secondary users and the function of transferring communication data received from the primary communication device 30 or the secondary communication device 40-1 to the communication network 15.

When the communication relaying unit 200 receives authentication information for authenticating the primary user from the primary communication device 30, the first authenticating unit 220 performs authentication of the primary user on the basis of authentication information associated with the primary user, recorded in the account DB 25. The first encryption unit 230 decrypts the communication data received by the communication relaying unit 200 from the primary communication device 30 according to the first encryption system, if the authentication by the first authenticating unit 220 is successful. When the communication relaying unit 200 receives authentication information for the secondary user from the primary communication device 30, the second authenticating unit 240 performs authentication of the secondary user on the basis of authentication information associated with the secondary user recorded in the account DB 25. The second authenticating unit 240 further decrypts the communication data received from the secondary communication device 40-1 in the communication data decrypted by the first encryption unit 230 according to the second encryption system if the authentication by the second authenticating unit 240 is successful. The communication relaying unit 200 transfers the communication data decrypted by the first encryption unit 230 and/or the second encryption unit 250 to the communication network 15.

The function of transferring communication data received from the communication network 15 to the primary communication device 30 or the secondary communication device 40-1 will be described below.

If the communication relaying unit 200 receives communication data directed to the secondary communication device 40-1 from the communication network 15, the second encryption unit 250 encrypts the communication data according to the second encryption system. Then, the first encryption unit 230 further encrypts the communication data obtained from the second encryption unit 250 according to the first encryption system. If the communication relaying unit 200 receives communication data directed to the primary communication device 30 from the communication network 15, the first encryption unit 230 encrypts the communication data in accordance with the first encryption system. Then, the communication relaying unit 200 transfers the communication data encrypted by the second encryption unit 250 and/or the first encryption unit 230 to the primary communication device 30.

In this way, the communication relaying unit 200 performs encrypted communication with the primary communication device 30 in accordance with the first encryption system and also performs encrypted communication with the secondary communication device 40-1 in accordance with the second encryption system. This can protect the privacy of the communicated information and also prevent tampering of the communication, as in a case where the primary and secondary users communicate over different communication lines.

The accounting unit 260 records in the account DB 25 an amount of charge to be charged to the primary user which is predetermined irrespective of the amount of communication performed through the primary communication device 30. For example, the accounting unit 260 records a communication charge of 2,980 yen which is predetermined for the primary user associated with Account A. The accounting unit 260 then reduces the amount of communication charge recorded in the account DB 25 if authentications by the first authenticating unit 220 and the second authenticating unit 240 are successful and the secondary user connects the secondary communication device 40-1 to the primary communication device 30 and to the communication network 15 through PLC and FTTH. For example, communication is performed by using Account B, which is the secondary user's account, through the primary communication device 30, the accounting unit 260 reduces a communication charge of 2,980 yen associated with Account A by a predetermined amount. At the same time, the accounting unit 260 increases the amount of communication charge to be charged to the secondary user.

Figure 3:
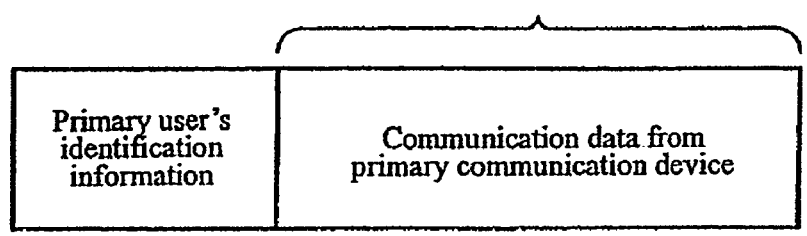
FIG. 3 shows an exemplary structure of communication data received by the communication relay system 20 from a primary communication device 30.
Figure 3:
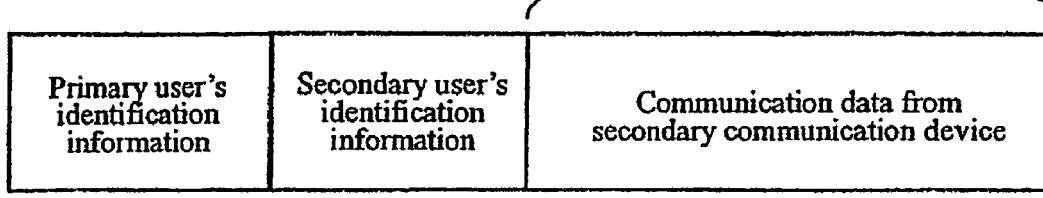

FIG. 3 shows an exemplary structure of communication data received by the communication relay system 20 from the primary communication device 30. Part (a) shows communication data received by the communication relay system 20 directly from the primary communication device 30. As shown in (a), the communication relaying unit 200 performs encrypted communication with the primary communication device 30 by using communication data encrypted in accordance to the first encryption system. The communication relaying unit 200 receives identification information identifying the primary user contained in the header of the communication data. The header is not encrypted according to the first encryption system. Accordingly, the first encryption unit 230 can identify the primary user prior to encryption and decrypt the communication data in accordance with an encryption system associated with the primary user.

Part (b) shows communication data received by the communication relay system 20 from the secondary communication device 40-1 through the primary communication device 30. As shown in (b), the communication relaying unit 200 performs encrypted communication with the secondary communication device 40-1 by using communication data encrypted in accordance with the second encryption system and further encrypted in accordance with the first encryption system. On the other hand, the communication relaying unit 200 receives identification information identifying the secondary user contained in the header of the communication data encrypted in accordance with the second encryption system. The header is not encrypted according to the second encryption system. Accordingly, the accounting unit 260 can identify the secondary user at the time when decryption with the first encryption system was performed, without performing decryption according to the second encryption system.

Figure 4:
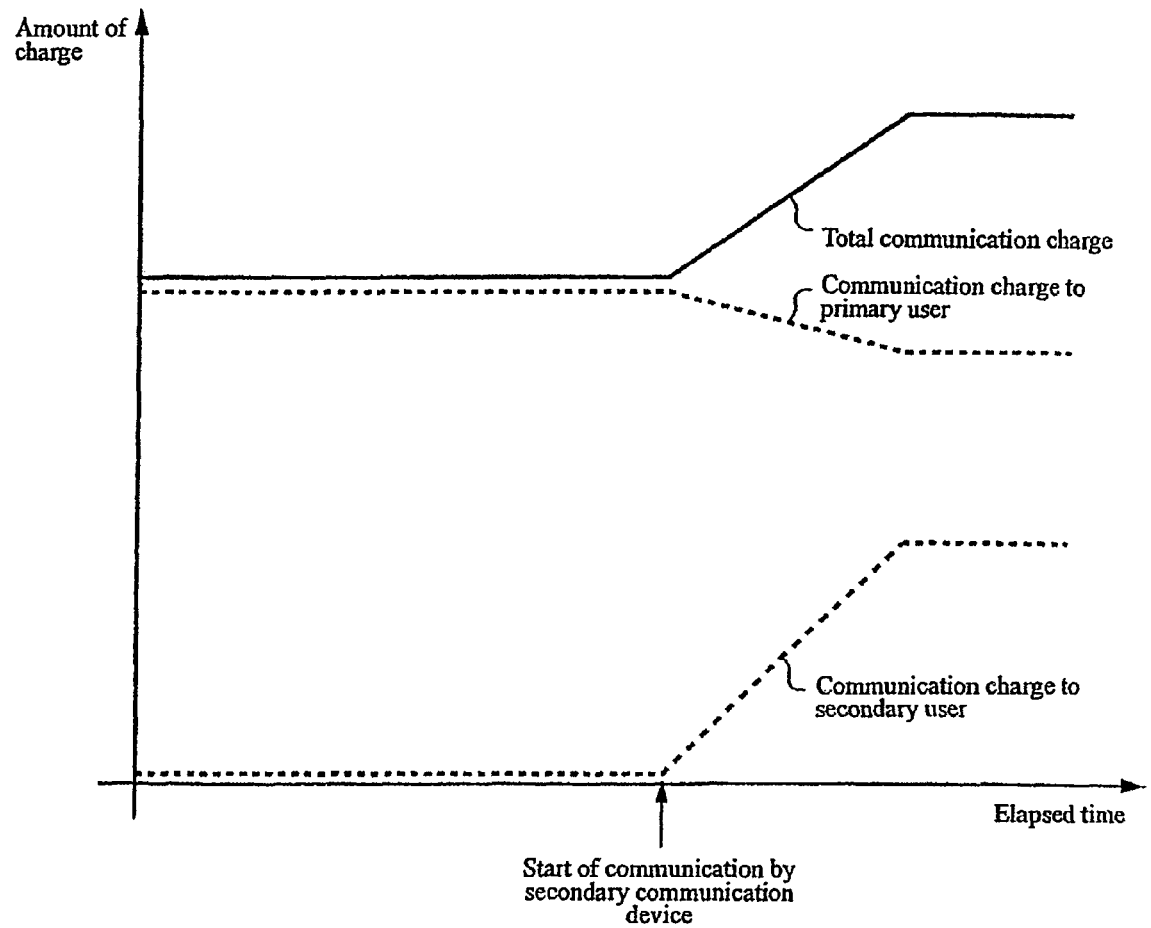
FIG. 4 shows communication charges of users that are changed according to the amount of communication performed by a secondary communication device 40-1.

FIG. 4 shows the communication charge to each user which is changed according to the amount of communication performed by the secondary communication device 40-1. In the example shown in FIG. 4, the communication charge to the primary user is basically fixed. The communication charge to the secondary user is determined on an as-used basis and is proportional to the amount of communication. The term "the amount of communication" herein refers to the number of packets sent and received as communication data. Alternatively, the amount of communication may be the amount of connection time that elapsed from a successful authentication to disconnection of the communication.

Because the communication charge to the secondary user is determined on an as-used basis, the secondary user is not charged before the secondary communication device 40-1 starts communication. On the other hand, the primary user is charged the predetermined, primary user's communication charge even before the secondary communication device 40-1 starts communication because the communication charge is a fixed charge.

When the secondary communication device 40-1 starts communication through the primary communication device 30, the accounting unit 260 starts to increase the communication charge charged to the secondary user in the account DB 25 because the communication charge to the secondary user is determined on an as-used basis. On the other hand, the accounting unit 260 reduces the communication charge charged to the primary user in the account DB 25. Preferably, the accounting unit 260 increases the amount of the communication charge to the subscriber authorized to use the secondary communication device 40-1 and reduces the communication charge charged to the primary user by an amount less than the amount by which the charge to the subscriber is increased. This can increase the telecommunication provider's profits as the number of secondary users increases while giving an incentive to the primary user for allowing secondary use of the communication line.

More preferably, the accounting unit 260 charges a predetermined amount to the secondary user regardless of the amount of communication if the amount of communication performed by the secondary communication device 40-1 exceeds a predetermined upper limit. In that case, the accounting unit 260 reduces the primary user's communication charge by a predetermined amount. This can set a ceiling on the communication charge charged to the secondary user and consequently can further promote the secondary use of the communication line. More preferably, if the primary communication device 30 is set in a state in which another subscriber cannot connect a secondary communication device 40-1 to the primary communication device 30, the accounting unit 260 decreases the reduction in the primary user's communication charge recorded in the account DB 25, as compared with a case where it is not placed in such state. This gives an incentive to the primary user for increasing the secondary user's opportunity to perform communication.

The communication charges given in this example is for illustrative purpose only; there may be many variations. For example, the accounting unit 260 may charge a fixed communication charge regardless of the amount of communication performed by the secondary communication device 40-1. In that case, the accounting unit 260 may reduce the primary user's communication charge according to the number of secondary communication devices that have connected to the communication line of the primary user. For example, if the communication relay system 20 is used by 10 primary users and 50 secondary users, the accounting unit 260 may reduce the communication charge charged to each of the 10 primary users by a predetermined percentage of the total of the communication charges charged to the 50 secondary users. For example, if each secondary user pays a fixed communication charge of 1,980 yen, the total amount is 99,000 yen. If 5 percent of the amount of 99,000 yen is the predetermined percentage of the reduction, a total amount of 4,950 yen can be reduced from the total of the charges to the 10 primary uses. Then, the accounting unit 260 may reduce the communication charge charged to each primary user by 495 yen or may reduce the charge charged to each primary user by an amount that depends on the amount of communication performed by the secondary users over the communication line of the primary user.

Figure 6:
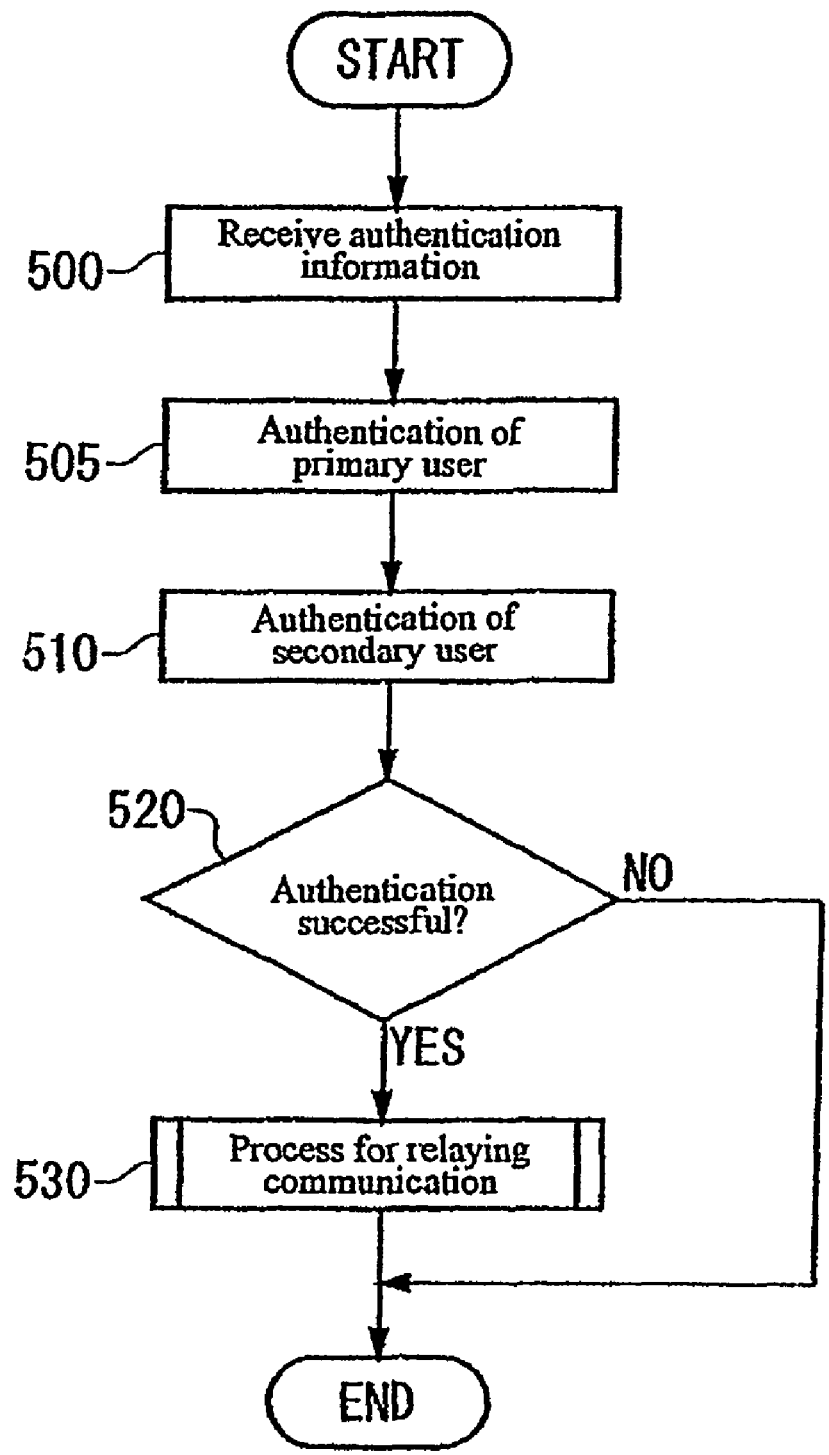
FIG. 6 is a flowchart of a process performed by the communication relay system 20 for communication with a primary communication device 30 and/or secondary communication devices 40-1-40-N.

FIG. 6 is a flowchart of a process performed by the JP920040205US1 16 communication relay system 20 to communicate a primary communication device 30 and/or a secondary communication device 40-1-40-N. The communication relaying unit 200 receives authentication information of each of a primary user and a secondary user first (500). The first authenticating unit 220 performs authentication of the primary user (505) and the second authenticating unit 240 performs authentication of the secondary user (510). If the authentication of the primary or secondary users is successful (520: YES), then the communication relaying unit 200 starts to relay communication (530).

If the authentication of the secondary user fails, the communication relaying unit 200 performs normal communication with the primary communication device 30 and, if the authentication of the primary user also fails, the communication relaying unit 200 does not perform communication with any of the communication devices. Actions in these cases are substantially the same as those in known conventional techniques and therefore the description of which will be omitted.

Figure 5:
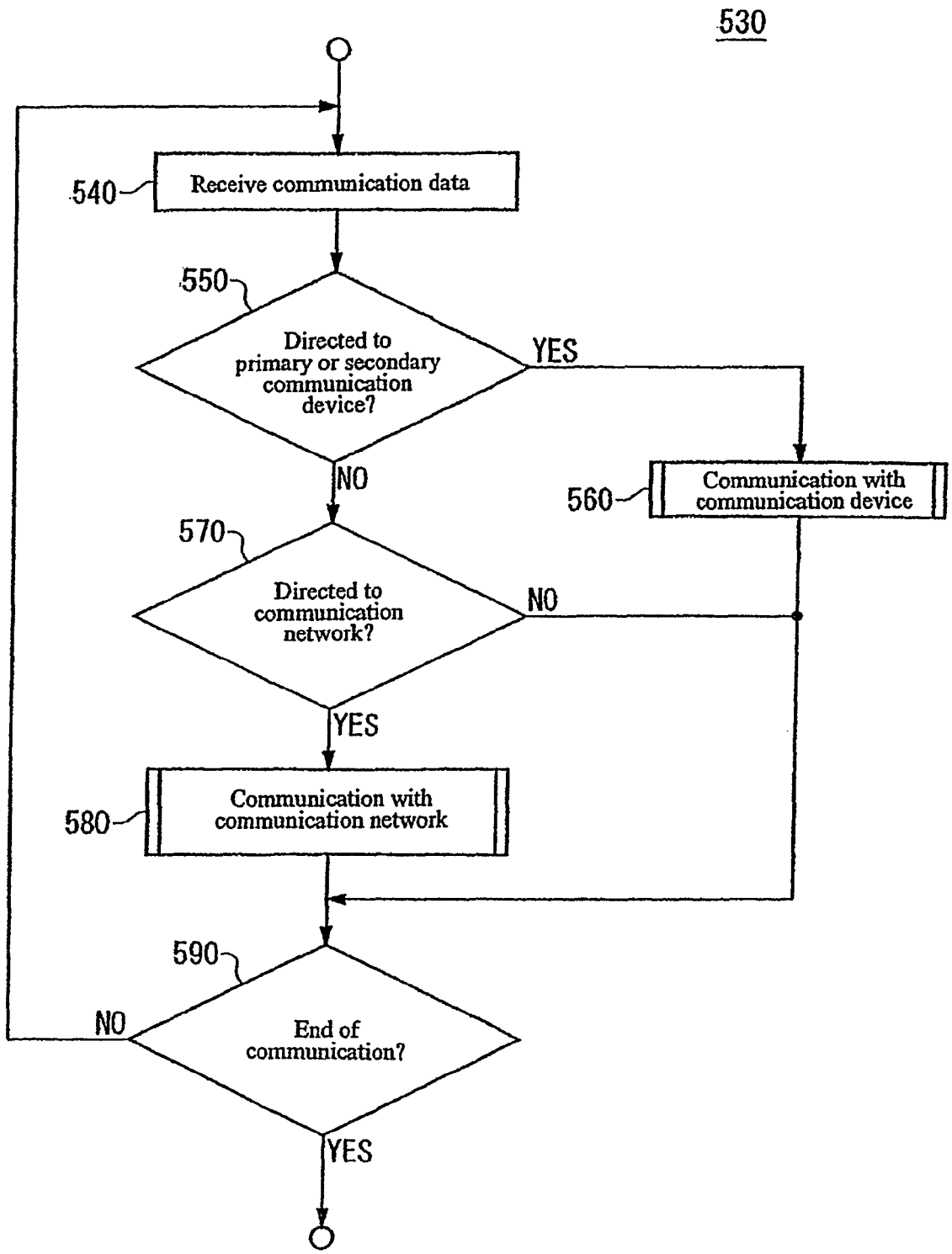
FIG. 5 shows details of step 530 of FIG. 6.

FIG. 5 shows details of step 530 in FIG. 6. When the communication relaying unit 200 receives communication data (540), the communication relaying unit 200 determines whether or not the communication data is directed to either the primary communication device 30 or the secondary communication device 40-1 (550). If it is directed to the primary communication device 30 or the secondary communication device 40-1, then the communication relaying unit 200 performs communication with the primary communication device 30 or the secondary communication JP920040205US1 17 device 40-1 (560). On the other hand, if the communication data is directed to neither the primary communication device 30 nor the secondary communication device 40-1 (550: NO), then the communication relaying unit 200 determines whether it is directed to the communication network 15 or not (570). If it is directed to the communication network 15 (570: YES), then the communication relaying unit 200 performs communication with the communication network 15 (580). If the communication data is not directed to any of the primary communication device 30, the secondary communication device 40-1, and the communication network 15, then the communication relaying unit 200 determines whether the communication has ended or not (590). If not (590: NO), then the process returns to 540.

Figure 7:
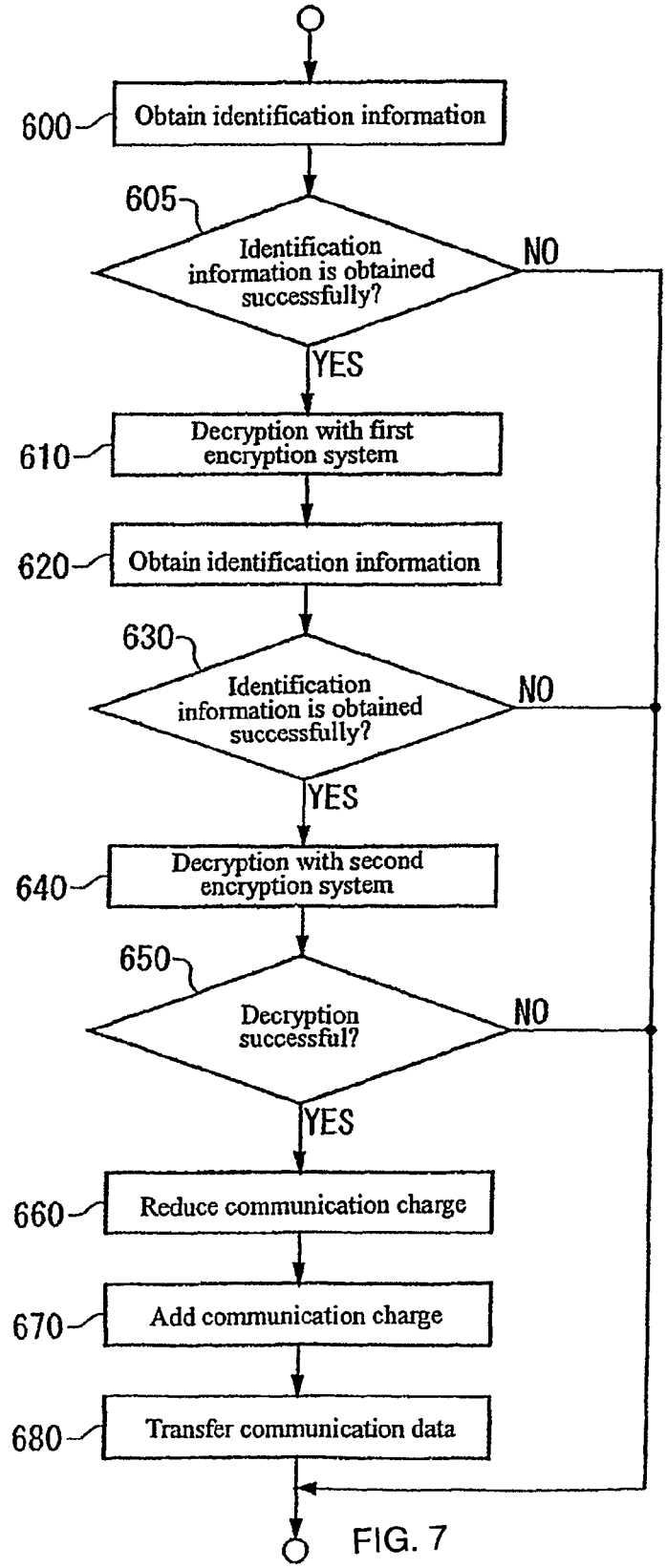
FIG. 7 shows details of step 580 of FIG. 5.

FIG. 7 shows details of step 580 in FIG. 5. The first encrypting unit 230 obtains the primary user's identification information (600). If first encrypting unit 230 successfully obtains the primary user's identification information (605: YES), then the first encryption unit 230 decrypts the communication data according to the first encryption system (610). Then, the accounting unit 260 obtains the secondary user's identification information, which has been decrypted by the first encrypting unit 230 but not decrypted by the second authenticating unit 240 (620). Based on this identification information, the encryption system agreed with the secondary user can be identified.

If the second encryption unit 250 successfully obtains the secondary user's identification information (630: YES), then the second encrypting unit 250 decrypts the communication data in the communication data decrypted by the first encryption unit 230 which is received from the secondary communication device 40-1, according to the second encryption system (640). More specifically, the second encryption unit 250 may select a second encryption system to be used for the decryption and may decrypt the communication data according to that second encryption system according to the secondary user's identification information included in the communication data it receives.

If it is successfully decrypted (650: YES), then the accounting unit 260 reduces the communication charge associated with the primary user recorded in the account DB 25 by a predetermined amount (660). In particular, the accounting unit 260 identifies the secondary user on the basis of the secondary user's identification information received by the communication relaying unit 200. The accounting unit 260 identifies the primary user on the basis of the primary user's identification information received by the communication relaying unit 200. Accounting unit 260 then reduces the communication charge charged to the identified primary user on the basis of the identification information of the identified secondary user. Because the identification information of each user is received through the communication line in this way, the need for an operation for associating and recording the primary user and the secondary user beforehand with each other is eliminated. Therefore, even if the secondary user takes along the secondary communication device 40-1, plugs it into a power outlet outside the home, and uses it, proper charging and charge reduction can be made. Then, the accounting unit 260 adds a predetermined amount to the JP920040205US1 19 communication charge associated with the secondary user identified by the identification information, recoded in the account DB 25 (670). The communication relaying unit 200 then transfers the communication data (680) to the communication network 15.

In this way, each time the communication relay system 20 receives communication data, the communication relay system 20 can compute the communication charge to each user on the basis of identification information included in the communication data it receives. Thus, it is possible to charge the secondary user a communication charge on an as-used basis while reducing the communication charge charged to the primary user according to the amount of communication performed by the secondary user.

Figure 8:
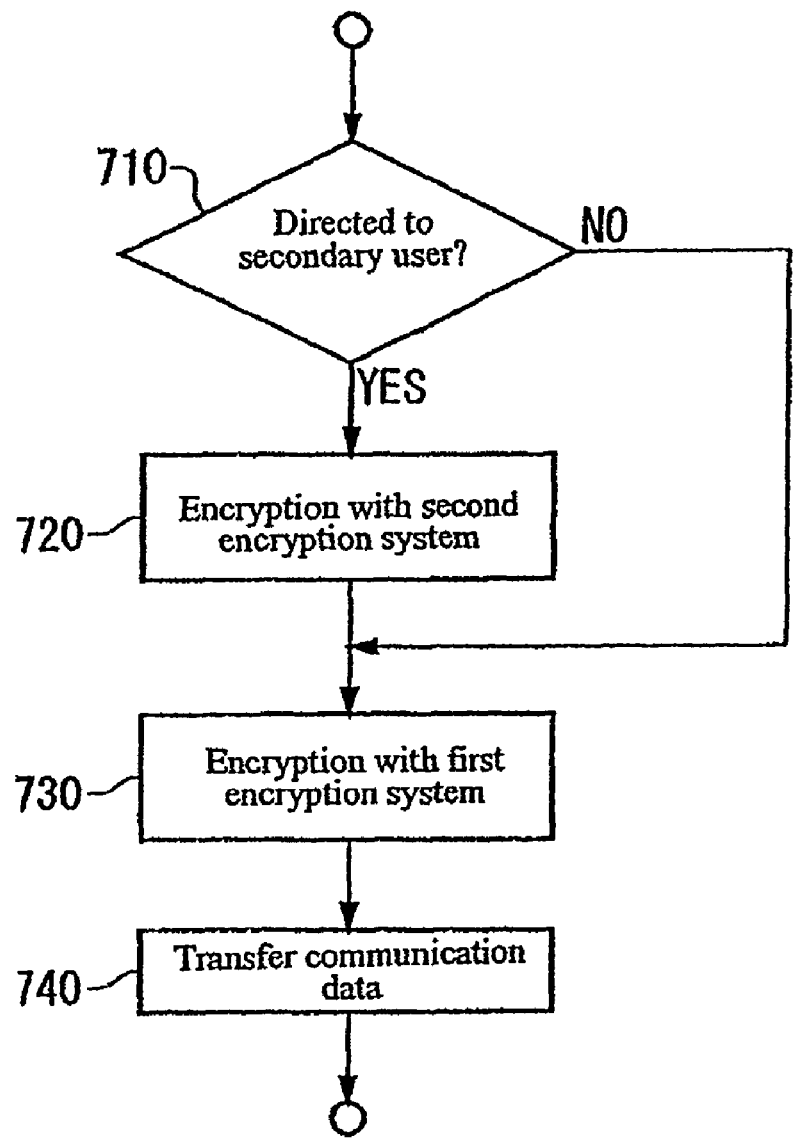
FIG. 8 shows details of step 560 of FIG. 5.

FIG. 8 shows details of 560 of FIG. 5. On reception of communication data from the communication network 15, the communication relay system 20 performs the following process. The second encryption unit 250 determines whether the destination of the received communication data is the secondary user or not (710). If the destination is the secondary user (710: YES), then the second encryption unit 250 encrypts the communication data according to a second encryption system 720 agreed with the destination communication device (for example the secondary communication device 40-1).

Then, if the destination is not the secondary user (710: NO), the fist encryption unit 230 encrypts the communication data received at the communication relaying unit 200 according to the first encryption system (730). If the destination is the secondary user, the fist encryption unit 230 further encrypts the communication data, encrypted with the second encryption system, according to the first encryption system (730). Then, the communication relaying unit 200 transfers the encrypted communication data to the first communication device 30 (740).

Figure 9:
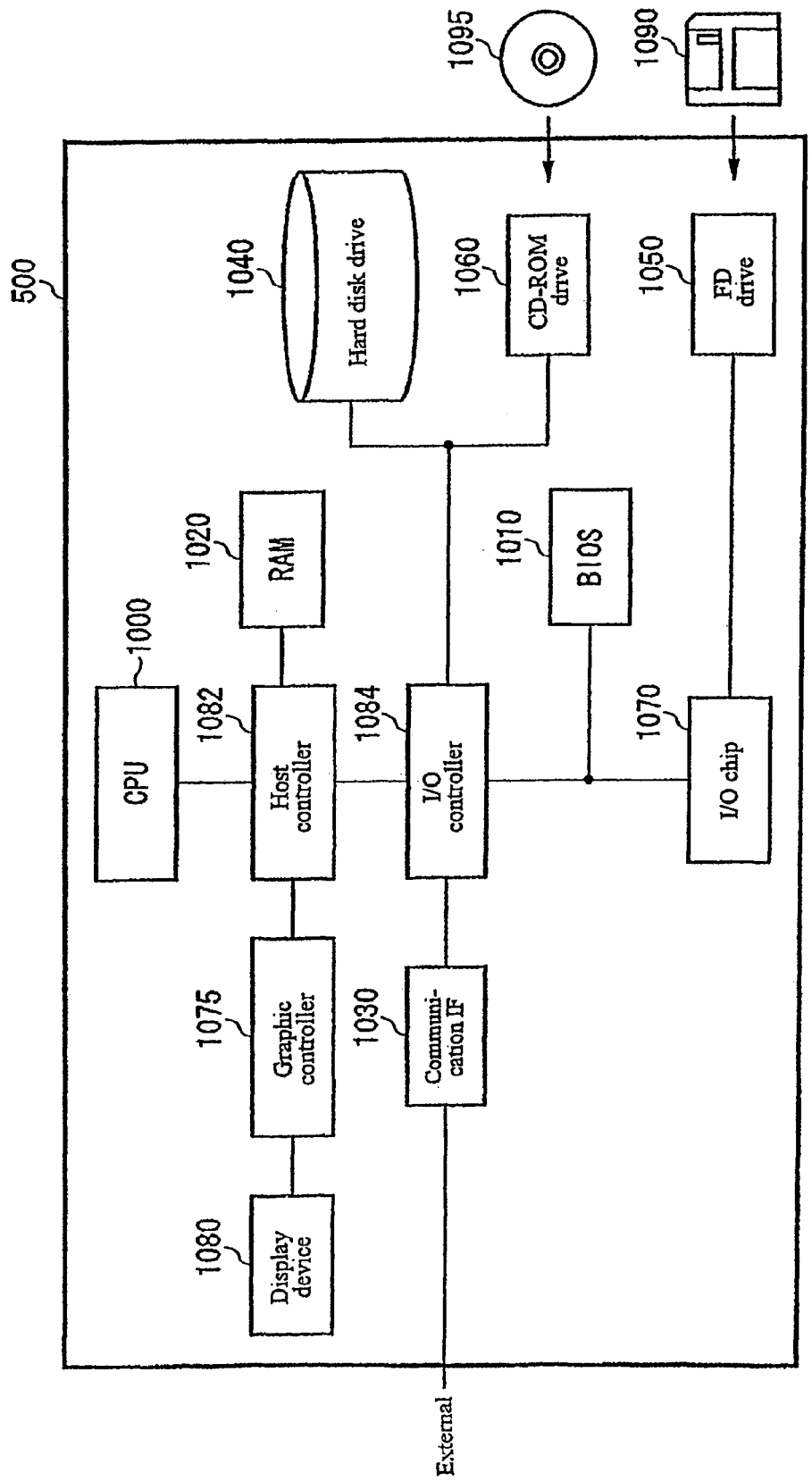
FIG. 9 shows a hardware configuration of an Information processing apparatus 500 functioning as the communication relay system 20.

FIG. 9 shows an exemplary hardware configuration of an information processing apparatus 500 which functions as the communication relay system 20. The configuration shown in FIG. 9 is given for illustrative purpose only. The communication relay system 20 may be implemented by cooperation by multiple information processing apparatuses. The information processing apparatus 500 has a CPU section including a CPU 1000, a RAM 1020, and a graphic controller 1075, which are interconnected through a host controller 1082, an input/output section including a communication interface 1030, a hard disk drive 1040, and a CD-ROM drive 1060, which are connected to the host controller 1082 through an input/output controller 1084, and a legacy input-output section including a ROM BIOS 1010, a flexible-disk drive 1050, and an input-output chip 1070, which are connected to the input/output controller 1084.

The host controller 1082 connects the RAM 1020 with the CPU 1000 and the graphic controller 1075, which access the RAM 1020 at higher transfer rates. The CPU 1000 operates according to programs stored in the ROM BIOS 1010 and the RAM 1020 to control each component. The graphic controller 1075 obtains image data generated by the CPU 1000 on a frame buffer provided in the RAM 1020 and causes JP920040205US1 21 it to be displayed on a display device 1080. Alternatively, the graphic controller 1075 may contain a frame buffer for storing image data generated by the CPU 1000.

The input/output controller 1084 connects the host controller 1082 with the communication interface 1030, the hard disk drive 1040, and the CD-ROM drive 1060, which are relatively fast input/output devices. The communication interface 1030 communicates with external devices through a network. The hard disk drive 1040 stores programs and data used by the information processing apparatus 500. The CD-ROM drive 1060 reads a program or data from a CD-ROM 1095 and provides it to the RAM 1020 or the hard disk drive 1040.

Connected to the input-output controller 1084 are the ROM BIOS 1010 and relatively slow input/output devices such as the flexible disk drive 1050 and the input-output chip 1070. The ROM BIOS 1010 stores a boot program executed by the CPU 1000 during boot-up of the information processing apparatus 500 and programs dependent on the hardware of the information processing apparatus 500. The flexible-disk drive 1050 reads a program or data from a flexible disk 1090 and provides it to the RAM 1020 or the hard disk drive 1040 through the input/output chip 1070. The input/output chip 1070 connects the flexible disk 1090, and various input/output devices through ports such as a parallel port, serial port, keyboard port, and mouse port, for example.

A program to be provided to the information processing apparatus 500 is stored on a recording medium such as a flexible disk 1090, a CD-ROM 1095, or an IC card and provided to the apparatus by a user. The program is read from the recording medium and installed in the information processing apparatus 500 through the input/output chip 1070 and/or input/output controller 1084 and executed. The program causes the information processing apparatus 500 to perform operations, which are the same as those described with respect to FIGS. 1 to 8 and therefore the description of which will be omitted here.

The program described above may be stored in an external storage medium. The storage medium may be a flexible disk 1090 or a CD-ROM 1095, or an optical recording medium such as a DVD and PD, a magneto-optical recording medium such as an MD, a tape medium, or a semiconductor memory such as an IC card. Alternatively, a storage device such as a hard disk or a RAM provided in a server system connected to a private communication network or the Internet may be used as the recording medium and the programs or modules may be provided from the storage device to the information processing apparatus 500 over the network.

As has been described, the communication relay system 20 according to the present embodiment can determine, on the basis of communication data it received from a communication device, whether or not a communication line is in a secondary use, can charge for the communication and make a reduction in communication charges according to the determination. Therefore, even if a communication line is used secondarily, appropriate communication charges to each user can be computed, and consequently the communication line can be effectively used and use of communication services can be promoted.

While the present invention has been descried with respect to an embodiment thereof, the technical scope of the present invention is not limited to that described with the embodiment. It will be apparent to those skilled in the art that various modifications or improvements can be made to the embodiment. It will be apparent from the claims that embodiment to which such modifications and improvements are made also fall within the scope of the technical scope of the present invention.

What is claimed is:

1. A control method for controlling a communication relay system for providing a communication service to an existing communication network, comprising:

authenticating information from a primary and a secondary user wherein the primary user uses a primary user terminal receiving communication data through a fiber to a home communication line and the secondary user uses a secondary user terminal receiving communication data relayed from the primary user terminal through a power line communication line;

encrypting, via a first encryption system, a data communication from a source to a primary communication device connected to the fiber to the home communication line and the primary user terminal, wherein the encrypted data communication identifies the primary communication device;

relaying the encrypted data communication from the source to the primary communication device connected to the fiber to the home communication line and the primary user terminal;

determining whether the encrypted data communication is directed to the primary communication device or to a secondary communication device connected to the power line communication line and the secondary user terminal;

encrypting, via a second encryption system, the encrypted data communication, which is directed to the secondary communication device, to produce a twice-encrypted data communication;

passing the twice-encrypted data communication to the secondary communication device through the primary communication device after receiving authorization from the primary communication device;

charging a fixed monetary charge to the primary user for communicating performed in the relaying of the data communication to the primary communication device through the fiber to the home communication line; and charging a reduced amount of the fixed monetary charge as a proportioned monetary charge to the secondary user based on a proportional amount of data packets sent and received by the secondary user of the data communication relayed through the fiber to the home communication line.

* * * * *